United States Patent [19]

Wrulich et al.

[11] Patent Number: 4,585,275
[45] Date of Patent: Apr. 29, 1986

[54] PROCESS FOR SPRAYING THE BITS AND/OR THE FACING WITH PRESSURIZED LIQUID AS WELL AS APPARATUS FOR PERFORMING THIS PROCESS

[75] Inventors: Herwig Wrulich; Alfred Zitz; Otto Schetina, all of Zeltweg; Franz Schöffmann, Leoben, all of Austria

[73] Assignee: Voest-Alpine Aktiengesellschaft, Vienna, Austria

[21] Appl. No.: 594,525

[22] Filed: Mar. 29, 1984

[30] Foreign Application Priority Data

Apr. 11, 1983 [AT] Austria .................................. 1282/83

[51] Int. Cl.⁴ ............................................. E21C 35/22
[52] U.S. Cl. .................................................... 299/81
[58] Field of Search ........................... 299/81; 175/393

[56] References Cited

U.S. PATENT DOCUMENTS

| 4,212,497 | 7/1980 | Borowski et al. | 299/81 |
| 4,289,357 | 9/1981 | Hintermann et al. | 299/81 |
| 4,451,089 | 5/1984 | Paurat et al. | 299/81 |
| 4,470,636 | 9/1984 | Paurat et al. | 299/81 |
| 4,471,998 | 9/1984 | Hotger | 299/81 |

FOREIGN PATENT DOCUMENTS 0123619 7/1967 Czechoslovakia .................. 299/81
1110763 4/1968 United Kingdom ................ 299/81

Primary Examiner—Stephen J. Novosad
Assistant Examiner—Hoang C. Dang
Attorney, Agent, or Firm—Cushman, Darby & Cushman

[57] ABSTRACT

For reducing the risk of any overheating when cutting or crushing rock by means of a partial cut cutting machine and for facilitating crushing or, respectively, cutting of the material, a pressurized liquid, for example water, is intermittently sprayed within an area facing the area to be excavated. Said mentioned area facing the area to be excavated is realized in connection with a cutting head by providing within a range of center angle of the rotating movement of the cutting head a plurality of radial perforations (18) adjoining an axial bore (8) for the supply of pressurized fluid, noting that this range of central area corresponds to that area which faces the area to be excavated or, respectively, the mine face. Radial channels (22) of the cutting head coincide during rotation of the cutting head (1) with the radial perforations (18), said channels feeding the pressurized liquid to the exit openings provided on the periphery of the cutting head (1). The radial perforations (18) are arranged within a center angle of less than 180°, preferably 120° to 150°, and with predetermined rotating speed of the cutting head (1) this provides the possibility to realize preferred ejection frequencies between 10 and 20 Hz.

6 Claims, 3 Drawing Figures

PROCESS FOR SPRAYING THE BITS AND/OR THE FACING WITH PRESSURIZED LIQUID AS WELL AS APPARATUS FOR PERFORMING THIS PROCESS

The invention refers to a process for spraying the bits and/or the mine face with pressurized liquid, in particular water, by using a partial cut cutting machine as well as to an apparatus for supplying a pressurized liquid, in particular cooling water, to exit openings of a rotatable cutting head, in which apparatus the liquid is fed via an axial bore within a part non-rotatably connected to the cutting arm into the interior of the cutting head and via radial channels to the exit openings located at the periphery of the cutting head. For reducing the water consumption, there was developed a number of proposals by which it is intended to cool the bit and the mine face only if a substantial heating effect occurs on account of the cutting work. It is, for example, known to make the supply of water dependent on the load on the bits, which, however requires expensive constructions, because a separate valve must be associated with each individual bit. In connection with cutting rolls it is further already known to provide a sector control such that pressurized water arrives at the exit openings only within that range of central angles of the roll which is facing the mine face.

The invention now aims at providing a process of the initially mentioned type in which beside a marked reduction of the water consumption it becomes possible to work in mines without the danger of surpassing the ignition temperatures of explosive gases. For solving this task, the process according to the invention essentially consists in that the water is intermittently sprayed within an area of center angle of the cutting head facing the mine face. By intermittently delivering the pressurized liquid or, respectively, water there results a substantial reduction of the water consumption, thereby simultaneously obtaining the advantage that the rock to be excavated is repeatedly quenched, heated and quenched again. Such a thermal load of the rock facilitates crushing of the material, and the cutting expenditure and therewith, the energy consumption can be reduced. There results simultaneously a reduction of the maximum cutting temperature so that explosion hazard is minimized. The time span between the individual spraying steps or, respectively, ejection steps must be selected sufficiently small for reliably preventing ignition of explosive gases, noting that the time interval between the injection steps must be shorter than the ignition delay time of the gases in consideration, for example methane. In case of methane and in case of temperatures of 650° C. at the mine face there result, for example, ignition delay time intervals of approximately 10 s and these ignition delay time intervals become rapidly shorter with increasing temperature. At temperatures of approximately 1000° C., the ignition delay time intervals to be expected amount to approximately 1 s, for example. For this reason, the process is preferably performed with an ejection frequency between 10 and 20 Hz thus obtaining an optimum security against any ignition of explosive gases. With consideration of the usual rotating speeds of cutting heads there results an injection time interval of approximately 0.1 s, the ejection time being in an advantageous manner selected of approximately the same magnitude as the time interval between immediately subsequent ejection steps.

The process according to the invention can be performed in a particularly simple manner with an apparatus of the initially mentioned type which is, according to the invention, designed such that a plurality of radial perforations adjoins the axial bore, said radial perforations coinciding during rotation of the rotatable cutting head with one or more radial channels of the cutting head and said radial perforations extending over part of the circumference of the component part comprising the axial bore. In addition to the sector control, in which supply of water into the radial channels of the rotatable cutting head is effected within a predetermined area of center angle of the rotational axis or, respectively, the head, there is obtained in a particularly simple manner a subdivision of the spraying operation into individual spraying intervals.

In an advantageous manner, the radial perforations are arranged within a center angle of less than 180°, in particular 120° to 150°, so that the water consumption is limited to that partial area of one rotation of the cutting tool or, respectively, cutting head within which the bits can contact the mine face.

The radial perforations are preferably provided within a bushing being non-rotatably coupled to the cutting arm. Such a bushing coupled to the cutting arm or, respectively, to the head carrier rigidly connected with the cutting arm can in a simple manner be used in cutting machines comprising two cutting heads being rotatably supported on a cutting arm in an approximately normal relation, noting that the identical bushing can be inserted at both sides of the cutting arm in a position turned for 180° respectively, so that the area of center angle within which spraying of water is made possible, is always facing the mine face. For obtaining ejection time intervals and non-operative intervals of approximately equal magnitude between the individual ejection steps, the central distance of the radial perforations at the periphery of the bushing is approximately equal three times the free diameter of the perforations. The radial perforations can in a simple manner be formed of radial bores, and preferably 6 to 10 radial bores are arranged within the center angle extending over less than 180°, so that with consideration of usual rotating speeds of cutting heads within the range of 1 to 4 $s^{-1}$ ignition phenomena can reliably be avoided.

In the following, the invention is further illustrated with reference to an example of embodiment shown in the drawing.

Figure 1:
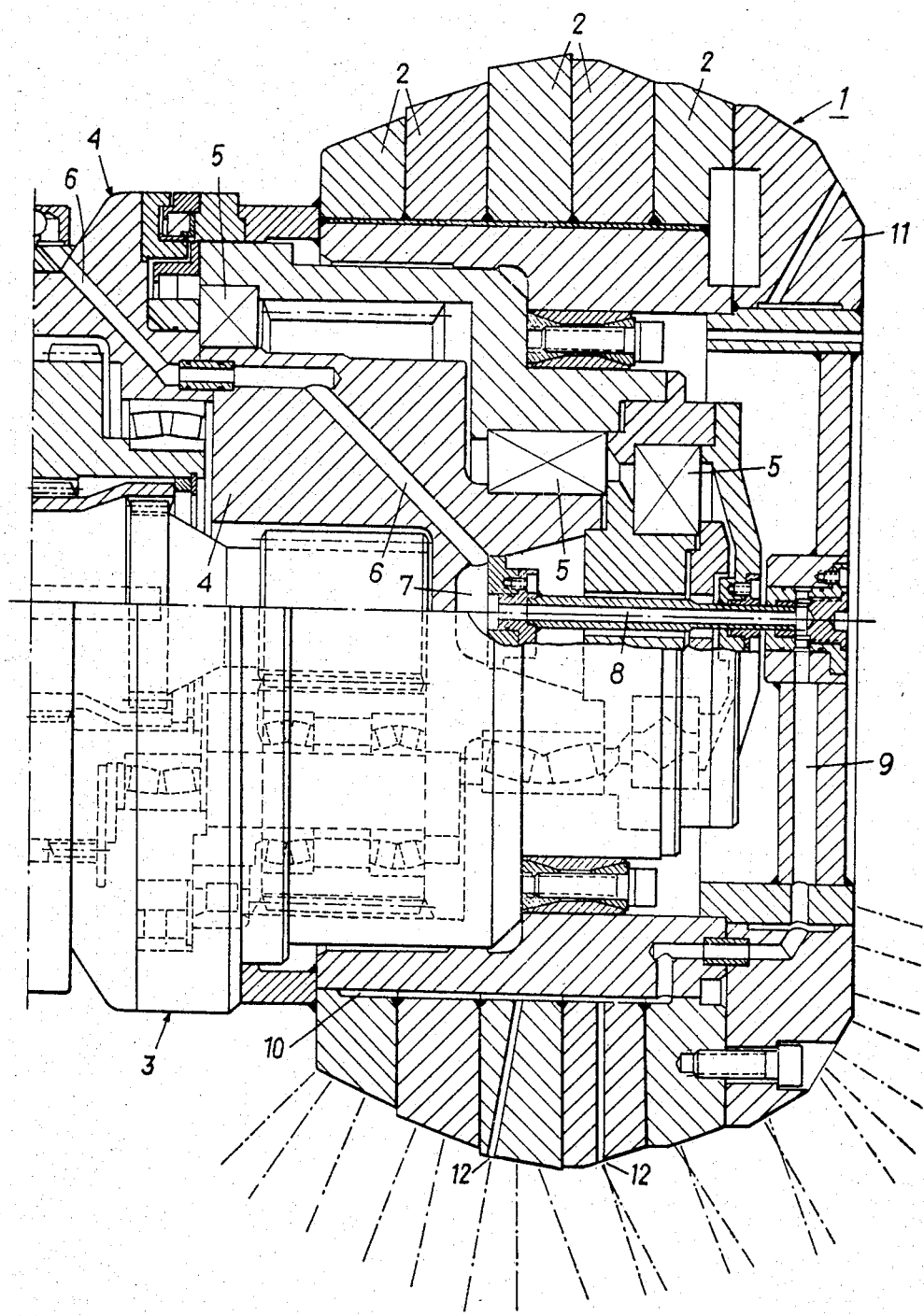
FIG. 1 shows a cross section through a cutting head of the prior art.

The cutting head 1 shown in FIG. 1 is composed of mutually welded discs 2 rotatably supported on a cutting arm not shown. The last stage of the reduction gearing is indicated by dashed lines and designated by 3. The cutting head is supported by anti-friction bearings 5 in a carrier 4 connected with the cutting arm.

The water supplied first flows through channels 6 provided within the carrier 4 and enters a distributing chamber 7 from where the water flows through a correspondingly sealed supply conduit 8 and radial conduits 9 into the distributing cavities 10 extending in axial direction of the cutting head. The front plate 11 of the cutting head 1 is connected with the base member of the cutting head by means of screws. From the distributing cavities 10, the water flows via substantially radial bores 12 to the exit nozzles which may be housed in the bit holder.

Figure 2:
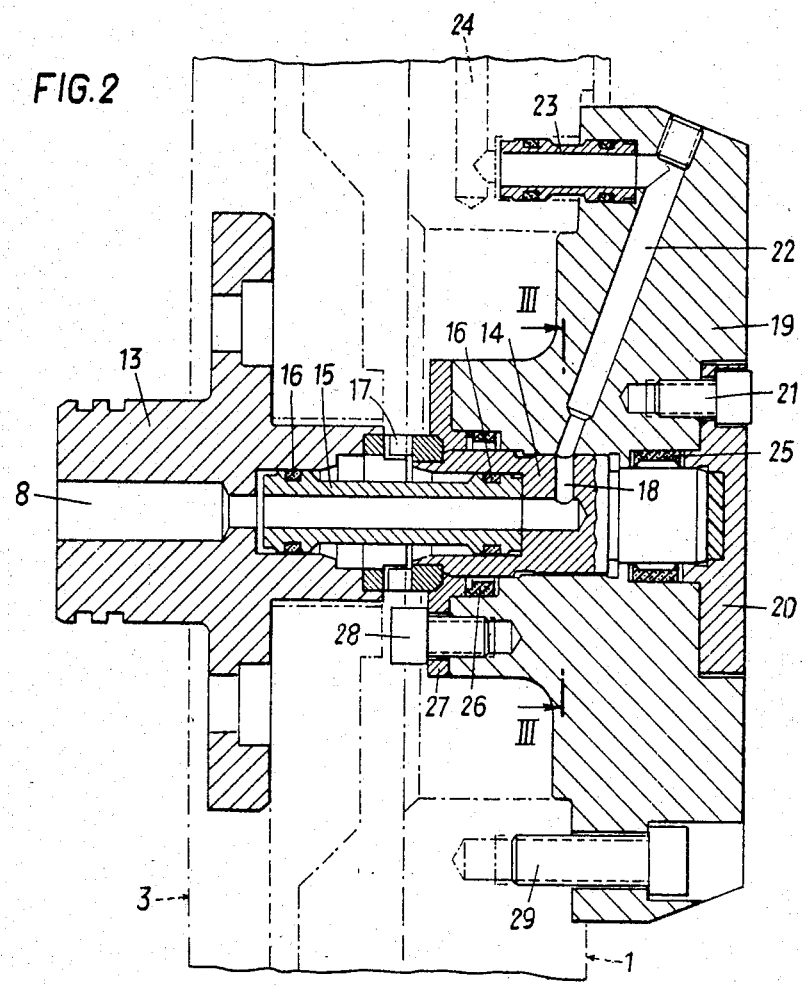
FIG. 2 shows a cross section through the water supply means according to the invention analogous to the section of FIG. 1

In the embodiment according to FIG. 2, the axial supply conduit 8 opens into a bushing 14 non-rotatably coupled to the carrier 13. For facilitating positioning of the bushing 14 in correct position, the axial supply conduit 8 passes over into the bushing 14 via a sealing intermediate piece 15, the sealings being designated by 16. The bushing is non-rotatably connected with the carrier 13 by means of a claw clutch 17 and has radial bores 18. The front part 19 of the cutting head rotates on the bushing 14 and the cutting head can be connected with the drive means for the cutting head in an analogous manner as is the case with the embodiment according to FIG. 1. The bushing 14 is held in position by the front plate 20 being connected with the front part 19 by means of screws 21. The front part 19 includes the rotating and essentially radially directed bores 22 which are connected with the exit openings of the cutting head via a sealing sleeve 23 and the radial channels 24. The front part 19 rotating on the bushing 14 is sealed relative to the bushing 14 by means of sealings 25 and 26, the sealing 26 being held in position by means of a retainer ring 27 supported on the bushing 14. The retainer ring 27 is fixed to the rotating front part 19 by means of the screw 28. The further components of the cutting head being, for example, composed of individual discs can, for example, be connected with the rotating front part 19 by means of the screw 29, noting that the cutting head is supported, for example, on the carrier in the manner shown in FIG. 1, the carrier being stationary relative to the cutting arm.

Figure 3:
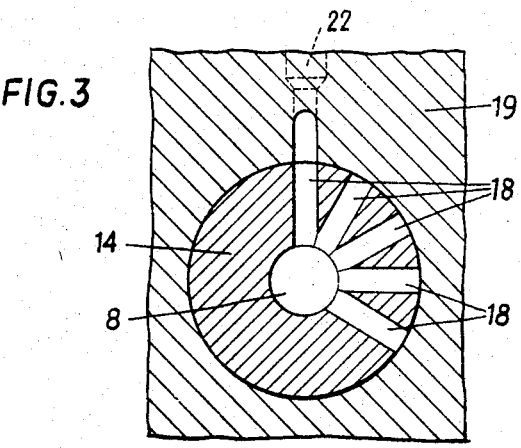
FIG. 3 shows a section along line III—III of FIG. 2 in an enlarged scale.

As can be seen from FIG. 3, the radial bores 18 of the bushing 14 extend over a range of center angle of approximately 120°, this range of center angle of 120° facing the mine face.

What is claimed is:

1. Apparatus for spraying a cutting bit and mine face with a cooling fluid comprising a cutting arm having a non-rotating axial fluid supply bore, a plurality of radial bores extending from the axial fluid supply bore, and positioned circumferentially around the fluid supply bore, said radial bores being arranged over a center angle of less than 180°, a rotating cutting head coaxially disposed about the axial fluid supply bore, the cutting head having at least one radial bore leading to a discharge port for directing cooling fluid to the mine face the radial bore in the cutting head being positioned such that on rotation of the cutting head the radial bore aligns with the radial bores from the axial fluid supply bore thereby imparting a pulsating fluid flow.

2. Apparatus as claimed in claim 1, wherein six to ten radial bores extending from the axial supply bore and are arranged within an angle of less than 180° measured from the axis of said supply bore.

3. Apparatus as in claim 1 wherein said radial bores are arranged over a center angle of 120° to 150°.

4. An apparatus for intermittently supplying a cooling fluid to a cutting bit of a mining machine and to a mine face comprising a cutting arm having a non-rotating axial fluid supply bore, a plurality of first radial bores extending from the axial fluid supply bore and positioned in an arc, a rotating cutting head arranged coaxially with the fluid supply bore, the cutting head having at least one second radial bore leading to a discharge port for directing cooling fluid to the mine face, the first radial bores being positioned in an arc about the supply bore, said arc corresponding to a contact area of the cutting head against the mine face, the second radial bore being positioned such that on rotation of the cutting head the second radial bore aligns sequentially with the first radial bores thereby imparting a pulsating fluid flow in an arcuate area corresponding to the mine face being cut.

5. Apparatus as claimed in claim 4, wherein the radial bores extending from the axial supply bore are provided on a bushing non-rotatably coupled to the cutting arm.

6. Apparatus as claimed in claim 5, wherein the distance between the centers of the radial bores at the periphery of the bushing is approximately three times the diameter of said radial bores.

* * * * *